(12) United States Patent
Huelsman et al.

(10) Patent No.: US 9,708,799 B2
(45) Date of Patent: Jul. 18, 2017

(54) WATER SUPPLY OUTLET CAP

(71) Applicant: McWane, Inc., Birmingham, AL (US)

(72) Inventors: Kyle James Huelsman, Oskaloosa, IA (US); Theodor Chad Harbour, Oskaloosa, IA (US); Jim Wakefield, Oskaloosa, IA (US)

(73) Assignee: McWane, Inc., Birmingham, AL (US)

( * ) Notice: Subject to any disclaimer, the term of this patent is extended or adjusted under 35 U.S.C. 154(b) by 0 days.

(21) Appl. No.: 15/079,278

(22) Filed: Mar. 24, 2016

(65) Prior Publication Data
US 2016/0201301 A1 Jul. 14, 2016

Related U.S. Application Data

(62) Division of application No. 14/073,733, filed on Nov. 6, 2013.

(51) Int. Cl.
F16L 21/00 (2006.01)
E03B 9/02 (2006.01)
F16L 55/115 (2006.01)
F16L 37/252 (2006.01)
A62C 35/20 (2006.01)

(52) U.S. Cl.
CPC ............... E03B 9/02 (2013.01); A62C 35/20 (2013.01); F16L 37/252 (2013.01); F16L 55/1157 (2013.01); F16L 55/1152 (2013.01); F16L 55/1155 (2013.01)

(58) Field of Classification Search
CPC .. F16L 55/1157; F16L 37/252; F16L 55/1152; F16L 55/1155; E03B 9/02; A62C 35/20

USPC .......................................................... 285/401
See application file for complete search history.

(56) References Cited

U.S. PATENT DOCUMENTS

| 489,107 | A | * | 1/1893 | Storz | F16L 37/252 285/110 |
| 2,793,787 | A | * | 5/1957 | Lescure | A47J 27/0808 220/323 |
| 3,916,939 | A | * | 11/1975 | Gillard | B25B 13/48 137/296 |
| 4,554,944 | A | * | 11/1985 | Daghe | B25B 13/16 137/296 |

(Continued)

Primary Examiner — Basil Katcheves
Assistant Examiner — Joshua Ihezie
(74) Attorney, Agent, or Firm — C. Brandon Browning; Maynard, Cooper & Gale, PC

(57) ABSTRACT

An apparatus for covering or sealing Storz-type outlets is shown and described. The apparatus includes an outer cap portion having a continuous sidewall, a connector portion for connecting the outer cap portion to the water supply assembly and a sealing cap portion rotatably coupled to the outer cap portion and located at least partially within a void defined by the continuous sidewall, the sealing cap portion including a pliable sealing portion for forming a seal about the water supply outlet. The connector portion includes a pair of lugs and a pair of ramped lug guides associated with an inner surface of the continuous sidewall. The pair of ramped lug guides are provided for receiving a pair of lugs of the water supply assembly. A nut portion extends from an outer face of outer cap portion for engagement by a tool such as a wrench or socket for rotating the outer cap portion about the water supply outlet.

1 Claim, 5 Drawing Sheets

(56) References Cited

U.S. PATENT DOCUMENTS

| | | | | |
|---|---|---|---|---|
| 5,092,229 | A | * | 3/1992 | Chen .................... A47J 27/0811 126/348 |
| 5,251,542 | A | * | 10/1993 | Itoh ......................... A47J 36/10 206/545 |
| 5,252,797 | A | * | 10/1993 | Komatsu ................ H05B 6/642 219/729 |
| 5,301,985 | A | * | 4/1994 | Terzini .................. F16L 37/252 285/376 |
| 6,102,444 | A | * | 8/2000 | Kozey .................... F16L 37/252 285/376 |
| 6,402,207 | B1 | * | 6/2002 | Segal .................... A61M 39/10 285/330 |
| 6,447,027 | B1 | * | 9/2002 | Lilley ................... F16L 37/113 285/148.19 |
| 6,450,542 | B1 | * | 9/2002 | McCue .................. F16L 25/14 285/12 |
| 7,387,320 | B2 | * | 6/2008 | Kozey ................ F16L 55/1155 285/148.19 |
| 2005/0077730 | A1 | * | 4/2005 | Thut .................... F16L 37/248 285/401 |
| 2006/0273587 | A1 | * | 12/2006 | Ambrosi ............... F16L 37/252 285/401 |
| 2010/0000999 | A1 | * | 1/2010 | Dalton, Jr. ............. B65D 90/22 220/327 |
| 2012/0080430 | A1 | * | 4/2012 | Hoff ........................ A47J 36/38 220/212 |

\* cited by examiner

WATER SUPPLY OUTLET CAP

RELATED APPLICATION

This application is a divisional of and claims priority to U.S. patent application Ser. No. 14/073,733, entitled "Water Supply Outlet Cap," filed on Nov. 6, 2013, the entire contents of which are incorporated herein by reference.

FIELD OF THE INVENTION

The present invention is directed to a water supply outlet cap, and more particularly to a Storz-type outlet and cap combination for use with fire hydrants.

BACKGROUND OF THE INVENTION

Storz-type outlets are used for quickly connecting and disconnecting fire hoses to fire hydrants and pumps. Exemplary Storz-type outlets and caps for sealing such outlets are found in U.S. Pat. Nos. 7,387,320; 6,733,045; 6,450,542; 6,447,027; and 6,102,444.

SUMMARY OF THE INVENTION

The present invention relates to caps for covering or sealing Storz-type outlets. According to one aspect of the invention, there is provided an apparatus for sealing a water supply outlet of a water supply assembly. The apparatus includes an outer cap portion having a continuous sidewall, a connector portion for connecting the outer cap portion to the water supply assembly and a sealing cap portion rotatably coupled to the outer cap portion and located at least partially within a void defined by the continuous sidewall, the sealing cap portion including a pliable sealing portion for forming a seal about the water supply outlet. The connector portion includes a pair of lugs and a pair of ramped lug guides associated with an inner surface of the continuous sidewall. The pair of ramped lug guides are provided for receiving a pair of lugs of the water supply assembly. A nut portion extends from an outer face of outer cap portion for engagement by a tool such as a wrench or socket for rotating the outer cap portion about the water supply outlet.

In use, the pair of lugs of the connector portion are engaged with ramped guides of the water supply assembly and a pair of lugs of the water supply assembly are engaged with the ramped guides of the connector portion. The outer cap portion is then rotated via the nut portion thereby directing the pairs of lugs along the ramped lug guides which draws the outer cap portion and sealing cap portion toward the water supply assembly. In this manner, the pliable sealing portion is pressed against the water supply assembly and a seal is formed about the water supply outlet. Because the sealing cap portion can rotate relative to the outer cap portion, once pliable sealing portion contacts the water supply assembly, it ceases rotating together with the outer cap assembly by virtue of the interaction between the assembly and the sealing portion. Since the sealing cap portion does not rotate after contract between the sealing portion and the assembly is made, the sealing portion is not torn or worn down by being scraped across the assembly.

According to another aspect of the invention, there is provided a method of sealing and, optionally unsealing, a water supply outlet of a water supply assembly. The method includes providing a cap including an outer cap portion, a connector portion and a sealing cap portion located at least partially within a void defined by a sidewall of the outer cap portion, engaging the connector portion with the water supply assembly, contacting a pliable sealing portion supported by the sealing cap portion to the water supply assembly, and rotating the outer cap portion in a first direction without rotating the sealing cap portion. Rotating the outer cap portion serves to draw the sealing cap portion towards the water supply assembly thereby compressing the pliable sealing portion against the water supply assembly and forming a seal about the water supply outlet. Engaging the connector portion with the water supply assembly includes inserting a pair of lugs of the connector portion into a pair of ramped lug guides in the water supply assembly and inserting a pair of lugs of the water supply assembly into a pair of ramped lug guides of the connector portion.

According to another aspect of the invention, there is provided an apparatus for sealing a water supply outlet of a water supply assembly. The apparatus includes an outer cap portion including a sidewall, a cover having an outer face and an inner face and a nut portion extending from the outer face of the cover. The apparatus further includes a Storz-type connector portion and a sealing cap portion rotatably coupled to a support member extending from the inner face of the cover, the sealing cap portion being coaxially aligned with the sidewall. An annular gasket is supported about a periphery of the sealing cap portion for forming a seal about the water supply outlet when the cap is coupled to the water supply assembly.

According to yet another aspect of the invention, there is provided an assembly for sealing a fire hydrant. The assembly includes a fire hydrant having an outlet with a first Storz connecting portion, a cap having continuous sidewall and a second Storz connecting portion, and a swivel seal rotatably supported by a post extending from the an inner face of the cap, the post including a snap ring for preventing axial movement of the swivel seal along the post. The swivel seal does not protrude outward from the confines of the cap but is contained entirely within the void defined by the cap continuous sidewall. A nut portion extends from an outer face of the cap for engagement by a tool for rotating the cap about the outlet. In use, the second Storz connecting portion is engaged with the first Storz connecting portion and the swivel contacted to the outlet. A tool such as a wrench is used to engage the nut portion and rotate the cap about the outlet thereby sealing the outlet.

DETAILED DESCRIPTION OF PRESENTLY PREFERRED EMBODIMENTS

FIGS. 1 through 4 depict a cap 10 in accordance with the present invention for covering or sealing a Storz-type outlet.

Figure 9:
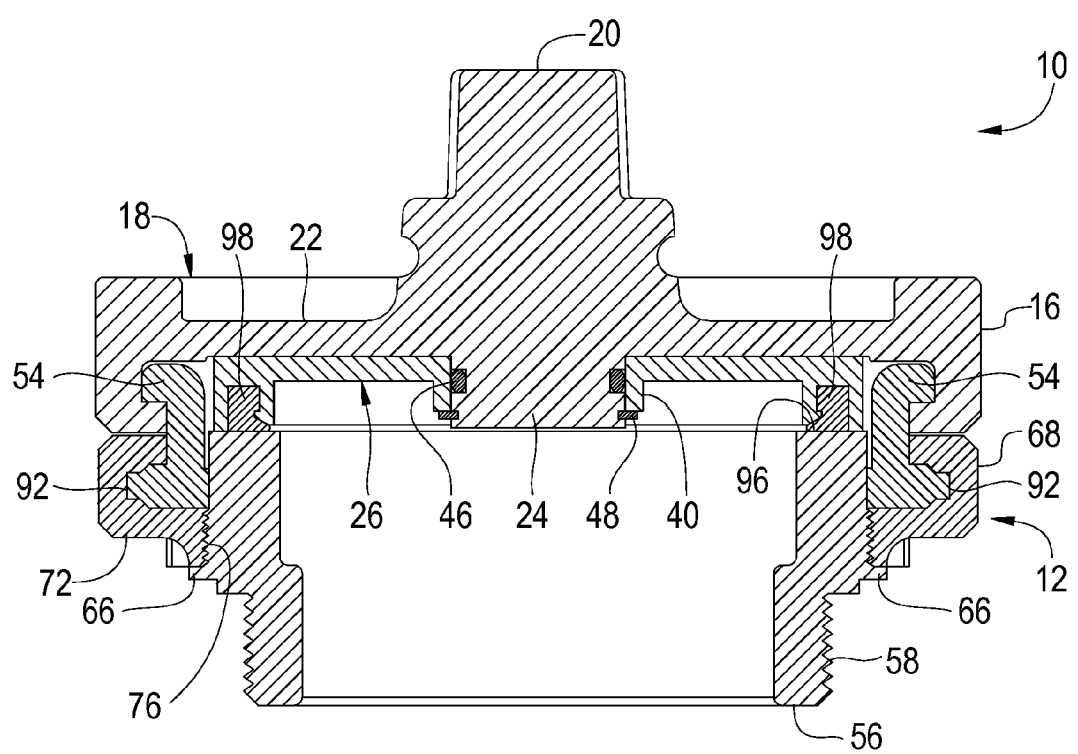
FIG. 9 is a sectional view of the cap of FIG. 1 engaged with the outlet of FIG. 5

FIGS. 5 through 8 depict a Storz-type outlet 12 in accordance with the present invention for attaching a fire hose to a fire hydrant. FIG. 9 depicts cap 10 coupled with outlet 12.

Referring to FIGS. 1 through 4, cap 10 includes a cap base 14 having a circular cover wall 18 and a sidewall 16. A nut 20 extends outwardly from a first face 22 of cover wall 18 along the axis of cap base 14. Nut 20 is configured to be received by a tool such as a wrench or socket for rotating the cap when the cap is in use. Projecting opposite to nut 20 from a second face 23 of cover wall 18 is a support post 24. Post 24 extends along the axis of cap base 14 and is provided for rotatably supporting a swivel seal 26, as described hereafter. Formed within post 24 are an o-ring receiving groove 25 and a snap ring receiving groove 27.

Figure 2:
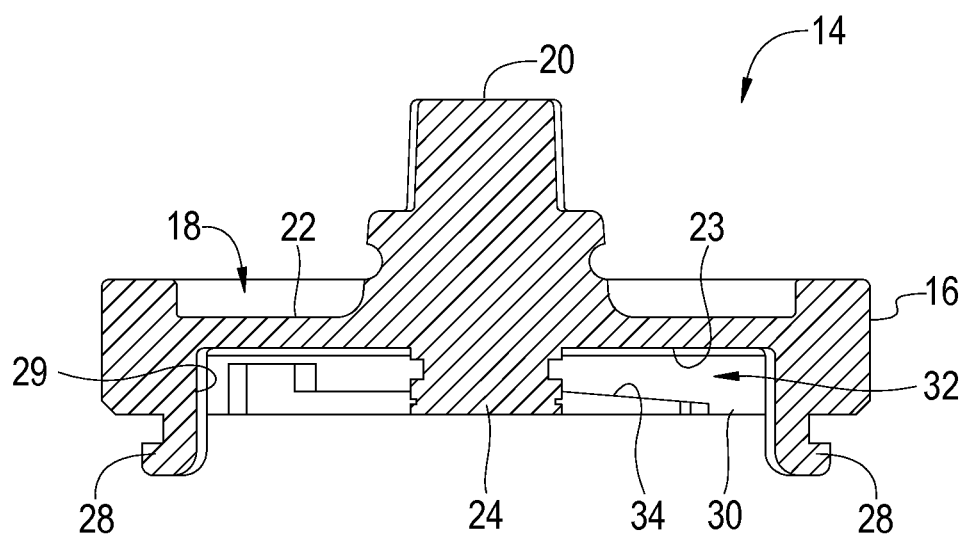
FIG. 2 is a sectional view of an outer cap portion the cap of FIG. 1.

Cap base 14 further includes a Storz-type coupling mechanism. The coupling mechanism includes a pair of cap lugs 28 extending from opposite sides of sidewall 16 and away from cover wall 18 and a pair of outlet lug receiving slots 30. Each of outlet lug receiving slots 30 opens into an outlet lug guide channel 32 which is defined by an outlet lug guide channel ramp 34, second face 23 of cover wall 18 which opposes ramp 34 and an inner surface 29 of sidewall 16 which extends between second face 23 and ramp 34. At the end of each outlet lug guide channel 32 is a stop 36 for arresting movement of outlet lugs, as discussed hereafter. As depicted in FIG. 2, the foregoing portions of cap base 14 may be integrally formed and may be constructed of plastic or metal or any other suitable material.

Figure 1:
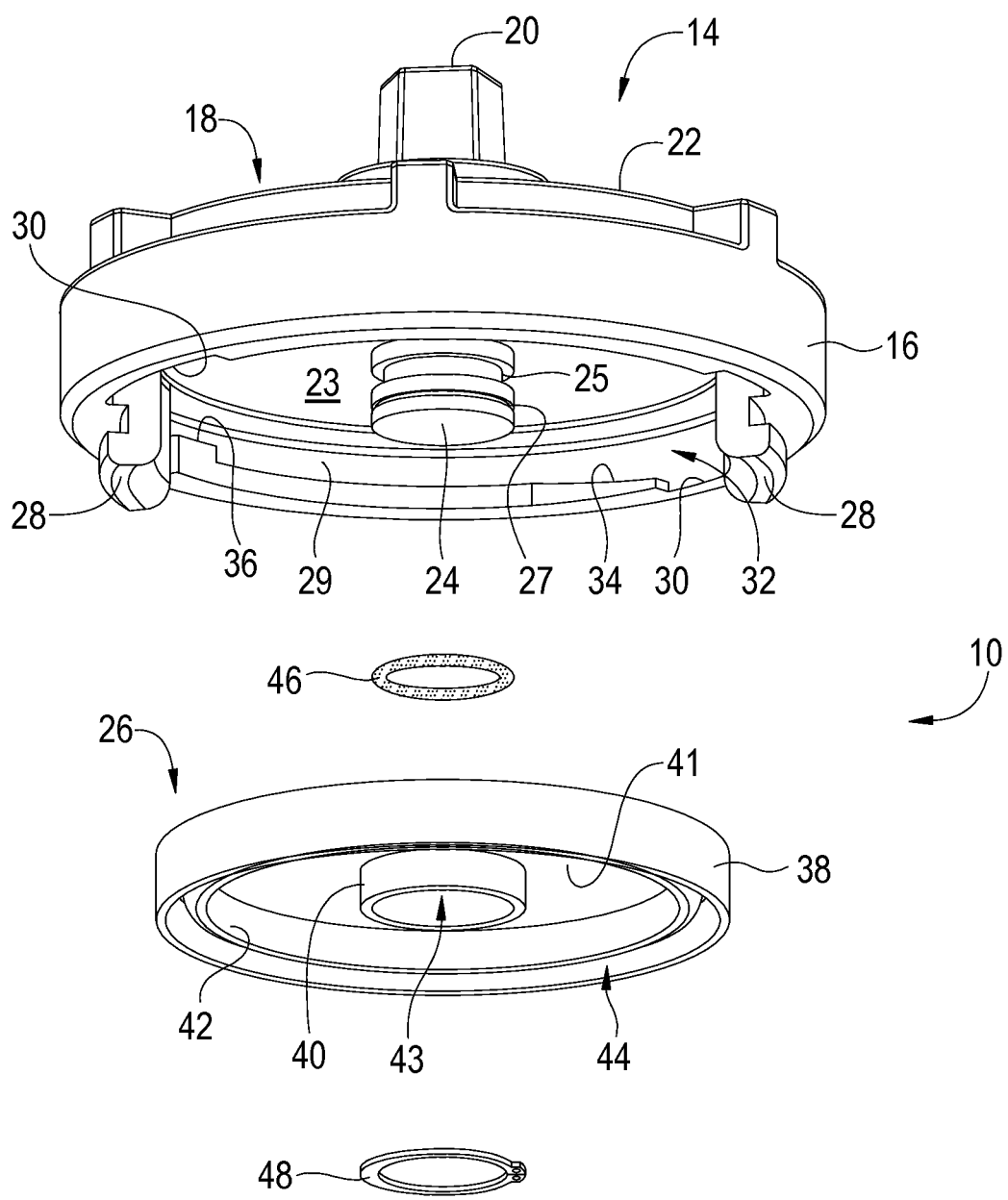
FIG. 1 is an exploded perspective view of a cap in accordance with a preferred embodiment of the invention.
Figure 3:
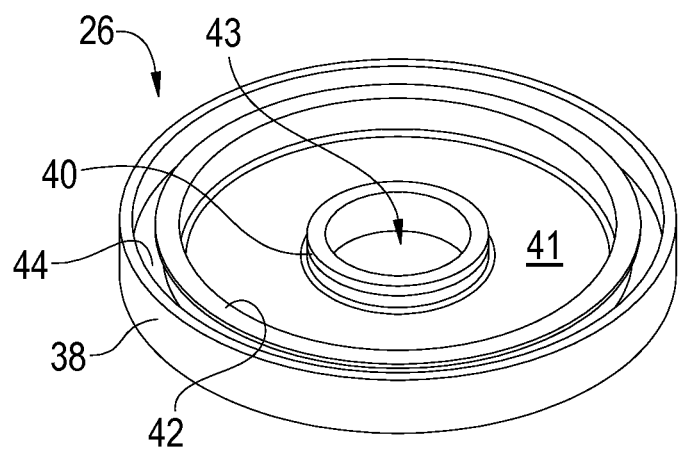
FIG. 3 is a perspective view of a sealing cap portion of the cap of FIG. 1.
Figure 4:
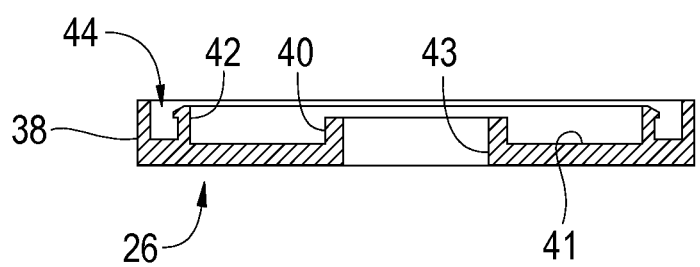
FIG. 4 is a sectional view of the sealing cap portion of FIG. 3.
Figure 5:
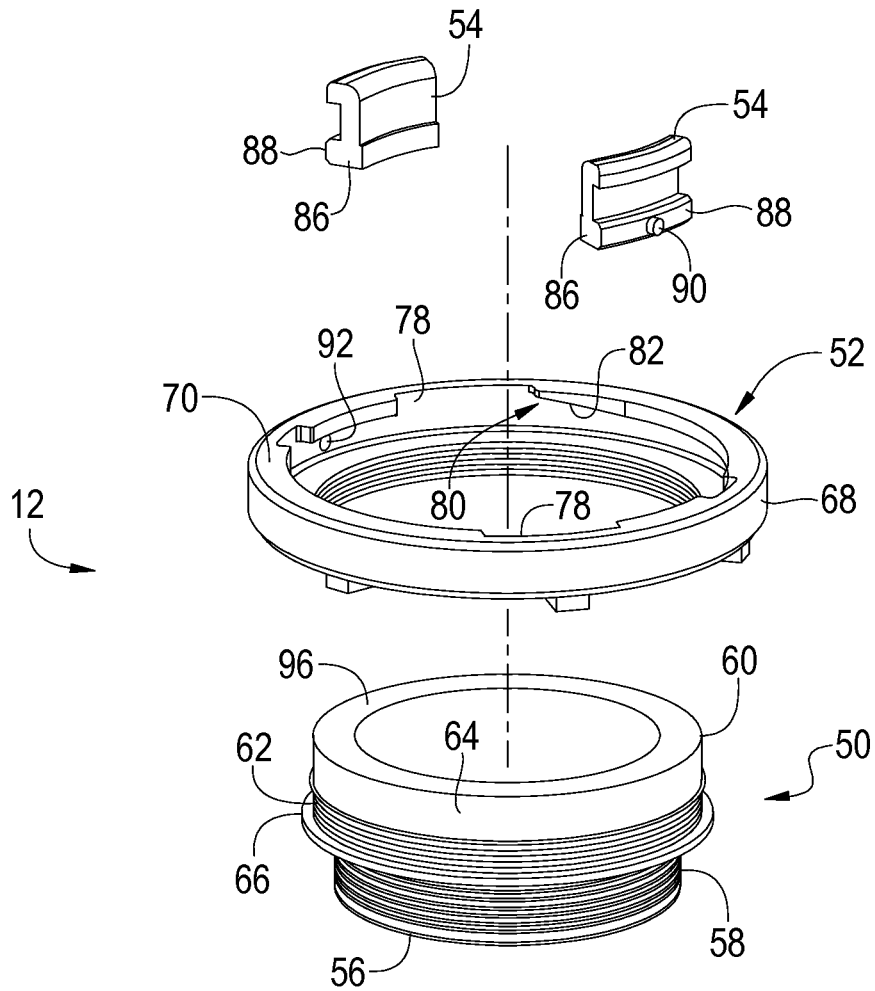
FIG. 5 is an exploded perspective view of an outlet in accordance with a preferred embodiment of the present invention.
Figure 6:
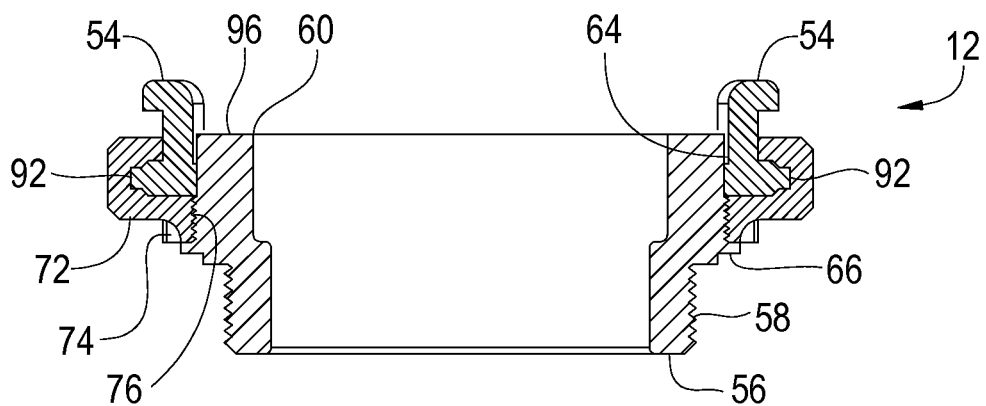
FIG. 6 is a sectional view of the outlet of FIG. 5.
Figure 7:
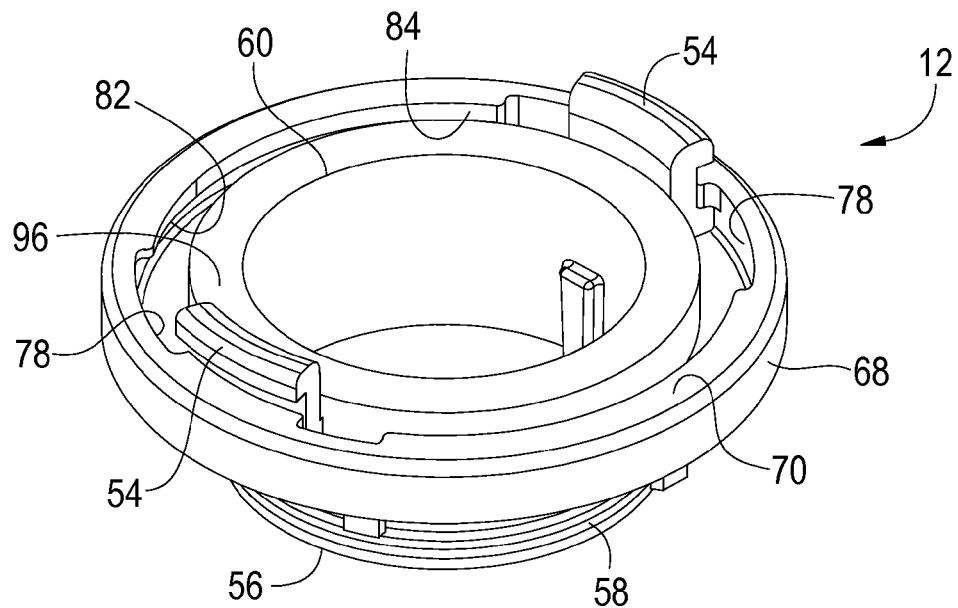
FIG. 7 is a perspective view of the outlet of FIG. 5.
Figure 8:
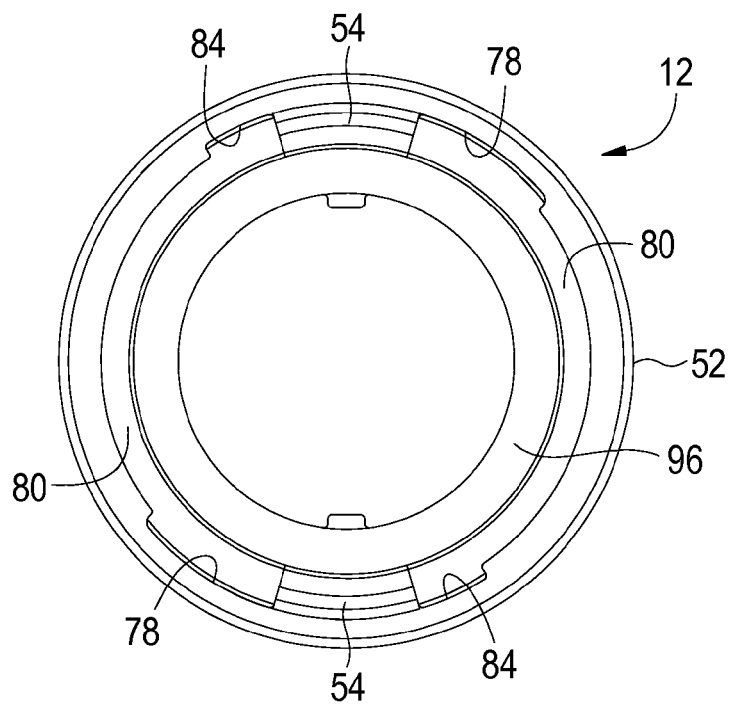
FIG. 8 is a top plan view of the outlet of FIG. 5

Referring to FIGS. 1, 3 and 4, swivel seal 26 includes a substantially flat, circular, sealing wall 41 from which a continuous outer sidewall 38 and a concentrically arranged continuous, inner sidewall 40 extend. A support post receiving channel 43 extends through the opening defined by inner sidewall 40 for receiving cap base support post 24. Formed between outer sidewall 38 and a gasket retaining wall 42, which extends immediately adjacent to an inner surface of outer sidewall 38, is an annular gasket receiving groove 44 which opens opposite sealing wall 41. A gasket (not shown) is locked in place within groove when cap 10 is in use. As depicted in FIG. 4 the foregoing portions of swivel seal 26, with the exception of the gasket (not shown), are integrally formed and may be constructed of plastic or metal.

Referring to FIGS. 1 and 9, to assemble cap base 14 with swivel seal 26, the cap base and swivel seal are axially aligned with support post 24 facing the sealing wall 41 side of swivel seal 26. An o-ring 46 is placed into o-ring receiving groove 25, and post 24 is inserted through the opening defined by gasket retaining wall 42. With swivel seal 26 fully seated on post 24, a snap ring 48 is placed within snap ring receiving groove 27 of post 24. Arranged in this manner, swivel seal 26 can rotate about post 24 so that swivel seal 26 and cap base 14 may rotate independently of another while preventing axial movement of swivel seal 26 relative to support post 24.

Referring to FIGS. 5 through 8, Storz-type outlet 12 generally includes a cylindrical center core 50, an outer ring 52 and a pair of outlet lugs 54. More particularly, center core 50 includes a first cylindrical portion 56 having an outer threaded surface 58 and a second cylindrical portion 60 that is axially aligned with and integrally formed with first cylindrical portion 56 to form a water flow channel. Second cylindrical portion 60 has an outer threaded surface 62 and a smooth outer surface 64, threaded surface 62 being located adjacent to second cylindrical portion 60. An annular stop 66 extends radially from second cylindrical portion 60 immediately adjacent to the edge thereof abutting first cylindrical portion 56. Stop 66 is provided to arrest rotation of outer ring 52 when it is screwed onto center core 50.

Outer ring 52 includes a continuous sidewall 68 having an inwardly projecting, upper, annular lip 70, an inwardly projecting, lower, annular lip 72 and a coupling mechanism for coupling outlet 12 to cap 10. Lower annular lip 72 terminates in an axially extending wall 74 having a threaded inner surface 76. Threaded inner surface 76 is arranged to receive outer threaded surface 62 of second cylindrical portion 60 of center core 50 when outlet 12 is assembled. The coupling mechanism includes outlet lugs 54 that extend from the inner surface of sidewall 68 from opposite sides of sidewall 68 and a pair of cap lug receiving slots 78. Each of cap lug receiving slots 78 opens into an cap lug guide channel 80 which is defined by a cap lug guide channel ramp 82, the inner surface of sidewall 68 and a lower surface of upper annular lip 70. At the end of each cap lug guide channel 80 is a stop 84. Unlike the coupling portion of cap 10, outlet lugs 54 are not integrally formed with outer ring 52. Instead, outlet lugs 54 are manufactured separately from outer ring 52 and assembled within the outer ring. In particular, each outlet plug includes a lower lip portion 86 having an outer edge 88 including an outwardly extending, integrally formed dowel 90. To assemble outlet lug 54 within outer ring 52, lower lip portion 86 is placed within the space defined between upper annular lip 70 and lower annular lip 72, and dowel 90 is inserted into a dowel receiving hole 92. To maintain each of outlet lugs within outer ring 52, center core 50 is screwed into outer ring 52 and arranged with smooth outer surface 64 of second cylindrical portion 60 sandwiching outlet lugs 54 between second cylindrical portion 60 and outer ring 52.

Referring to FIG. 9, when in use, cap 10 is coupled with outlet 12 for sealing the outlet. To seal outlet 12, cap 10 is arranged axially to outlet 12 with cap lugs 28 aligned with cap lug receiving slots 78 of outlet 12 and outlet lugs 54 aligned with outlet lug receiving slots 30 of cap 10. Cap 10 is then moved toward outlet 12 thereby inserting cap lugs 28 through cap lug receiving slots 78 and into cap lug guide channels 80 and inserting outlet lugs 54 through outlet lug receiving slots 30 and into outlet lug guide channels 32. Utilizing a wrench or socket, nut 20 is rotated thereby rotating cap 10. As cap 10 is rotated, cap lugs 28 are caused to ride along cap lug guide channel ramps 82 and outlet lugs 54 are caused to ride along outlet lug guide channel ramps 82. As the respective lugs ride along the respective ramps, cap 10 is forced closer to outlet 12. At some point, gasket 98 is brought to bear against a gasket seat 96 of outlet 12. When this occurs, the interaction of gasket 98 with gasket seat 96 creates sufficient friction to cause swivel seal 26 to overcome its tendency to rotate with cap base 16 and refrain from rotating as cap 10 is rotated further. By refraining from rotating together with cap base 16, gasket 98 is not caused to scrape across gasket seat 96 which can cause the gasket to tear or quickly wear out. Cap 10 is rotated until cap lugs 28 contact stop 84 in outer ring 52 and outlet lugs 54 contact stop 36 in cap 10. Arranged in this manner, gasket 98 is caused to press against gasket seat 96 with sufficient force to form a seal about the water flow channel defined by outlet 12.

As will be apparent to one skilled in the art, various modifications can be made within the scope of the aforesaid description. Such modifications being within the ability of one skilled in the art form a part of the present invention and are embraced by the claims below.

It is claimed:

1. A cap for sealing a water supply outlet of a water supply assembly comprising, an outer cap portion including a sidewall, a cover having an outer face and an inner face, and a nut portion extending from the outer face of the cover, a connector portion operatively engaged with the water supply assembly, and a sealing cap portion coupled to a support member extending from the inner face of the cover, the sealing cap portion being coaxially aligned with the sidewall and including an annular gasket supported substantially about a periphery of the sealing cap portion, wherein, when the sealing cap portion is engaged with the water supply assembly, the sealing cap is not rotatably arranged relative to the water supply assembly, and when the sealing cap is not engaged with the water supply assembly, the sealing cap is rotatably arranged relative to the water supply assembly.

* * * * *